United States Patent
Jensen et al.

(10) Patent No.: US 7,307,371 B2
(45) Date of Patent: Dec. 11, 2007

(54) ACTUATOR WITH AMPLIFIED STROKE LENGTH

(75) Inventors: Eric L. Jensen, Dayton, OH (US); William C. Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/283,455

(22) Filed: Nov. 18, 2005

(65) Prior Publication Data

US 2007/0114881 A1   May 24, 2007

(51) Int. Cl.
*H01L 41/08* (2006.01)
(52) U.S. Cl. ....................................................... 310/328
(58) Field of Classification Search ................ 310/328
See application file for complete search history.

(56) References Cited

U.S. PATENT DOCUMENTS

| | | | | |
|---|---|---|---|---|
| 2,565,158 A | * | 8/1951 | Williams | 310/328 |
| 2,587,482 A | * | 2/1952 | Keller | 200/82 R |
| 3,509,714 A | * | 5/1970 | Walton | 368/76 |
| 4,529,164 A | | 7/1985 | Igashira et al. | |
| 4,550,744 A | | 11/1985 | Igashira et al. | |
| 4,553,059 A | | 11/1985 | Abe et al. | |
| 4,726,741 A | | 2/1988 | Cusack | |
| 4,767,959 A | * | 8/1988 | Sakakibara et al. | 310/317 |
| 4,803,393 A | * | 2/1989 | Takahashi | 310/328 |
| 4,804,314 A | | 2/1989 | Cusack | |
| 4,909,440 A | * | 3/1990 | Mitsuyasu et al. | 239/96 |
| 4,995,587 A | * | 2/1991 | Alexius | 251/129.06 |
| 5,148,735 A | | 9/1992 | Veletovac | |
| 5,209,453 A | | 5/1993 | Aota et al. | |
| 5,270,595 A | | 12/1993 | Wisner | |
| 5,286,199 A | * | 2/1994 | Kipke | 434/114 |
| 5,779,149 A | | 7/1998 | Hayes, Jr. | |

(Continued)

FOREIGN PATENT DOCUMENTS

DE       43 06 073        6/1994

(Continued)

OTHER PUBLICATIONS

Etrema Products Inc., Standard Actuators, (http://etrema-usa.com/products/actuators/), Ames, IA, 2003 (2 pages).

(Continued)

*Primary Examiner*—Mark Budd
(74) *Attorney, Agent, or Firm*—Scott A. McBain

(57) ABSTRACT

An actuator having a housing that defines an interior volume and a primary driver that includes either a piezoelectric element or a magnetorestrictive element. The primary driver has first and second opposing ends and defines a longitudinal length therebetween. The first end of the primary driver is bearingly engaged with a reaction surface that is fixed relative to the housing. The second end of the primary driver longitudinally moves a bearing surface that partially defines a closed working chamber having a fixed quantity of an incompressible medium. An actuating rod extends through an orifice in the housing and has a first end projecting outwardly and a second end disposed within the working chamber. The cross sectional area of the orifice is less than the effective area of the bearing surface whereby the travel distance of the rod is amplified relative to the change in length of the primary driver.

20 Claims, 4 Drawing Sheets

U.S. PATENT DOCUMENTS

| | | | |
|---|---|---|---|
| 5,875,764 | A | 3/1999 | Kappel et al. |
| 5,907,211 | A | 5/1999 | Hall et al. |
| 6,034,466 | A * | 3/2000 | Blanding et al. ........... 310/328 |
| 6,040,643 | A | 3/2000 | Bruns |
| 6,062,533 | A | 5/2000 | Kappel et al. |
| 6,079,636 | A | 6/2000 | Rembold et al. |
| 6,142,443 | A | 11/2000 | Potschin et al. |
| 6,148,842 | A | 11/2000 | Kappel et al. |
| 6,168,133 | B1 | 1/2001 | Heinz et al. |
| 6,260,541 | B1 | 7/2001 | Ricci-Ottati et al. |
| 6,302,333 | B1 | 10/2001 | Hoffmann et al. |
| 6,307,286 | B1 | 10/2001 | Yamazaki et al. |
| 6,570,474 | B2 | 5/2003 | Czimmek |
| 6,884,040 | B2 | 4/2005 | Dooley |
| 6,891,286 | B2 | 5/2005 | Flanagan et al. |

FOREIGN PATENT DOCUMENTS

| | | |
|---|---|---|
| DE | 43 06 073 C1 | 6/1994 |
| DE | 197 27 992 | 1/1999 |
| DE | 19727992 A1 | 1/1999 |
| DE | 198 18 475 | 11/1999 |
| DE | 198 18 475 A1 | 11/1999 |
| WO | 99/58840 | 11/1999 |
| WO | WO99/58840 | 11/1999 |
| WO | 02/068250 | 9/2002 |
| WO | WO02/068250 | 9/2002 |

OTHER PUBLICATIONS

Lindensmith, et al., Magnetostrictive Inertial-Reaction Linear Motors, (www.nasatech.com) NASA Jet Propulsion Laboratory, Pasadena, CA, date believed to be Jun. 1998 (2 pages).

Ashley, Magnetostrictive Actuators, (www.memagazine.org) Mechanical Engineering, American Society of Mechanical Engineers, New York, NY 1998 (7 pages).

European Search Report dated Mar. 19, 2007.

Article in Etrema Products, Inc. - Etrema Products, Inc. - dated Oct. 15, 2005.

Feature Article in Mechanical Engineering - Magnetostrictive Actuators dated Oct. 15, 2005.

* cited by examiner

ACTUATOR WITH AMPLIFIED STROKE LENGTH

BACKGROUND OF THE INVENTION

1. Field of the Invention

The present invention relates to actuators and, more specifically, to actuators that employ either a piezoelectric or magnetostrictive element.

2. Description of the Related Art

Actuators that employ piezoelectric elements or magnetostrictive elements are known in the art. One of the most significant drawbacks of such actuators is that such piezoelectric and magnetostrictive elements experience only a relatively limited change in dimensions when actuated. Piezoelectric and magnetostrictive elements are, however, capable of exerting relatively significant forces when actuated and various actuator designs have been developed which amplify the dimensional change of such piezoelectric and magnetostrictive elements. For example, known automotive applications for such actuator designs include injection valve actuators.

While known actuator designs are useful, it is desirable to further develop such actuators to thereby facilitate additional uses of piezoelectric and magnetostrictive actuators.

SUMMARY OF THE INVENTION

The present invention provides an actuator that may employ either a piezoelectric or a magnetostrictive primary driver and which has a compact and relatively simple design.

The invention comprises, in one form thereof, an actuator that includes a housing defining an interior volume and a primary driver that includes either a piezoelectric element or a magnetostrictive element. The primary driver has first and second opposing ends and defines a longitudinal length between these first and second ends. The length of the primary driver is controllably variable. A reaction surface is fixed relative to the housing and is bearingly engaged with the first end of the primary driver. A bearing surface is operably coupled to the second end of said primary driver. The bearing surface is longitudinally moveable relative to the housing together with the second end of the primary driver as the length of the primary driver is varied. A closed working chamber is defined within the interior volume with a proximal portion of the working chamber being partially defined by the bearing surface and wherein longitudinal movement of the bearing surface varies the volume of the working chamber. The working chamber defines a first cross sectional area oriented transverse to the longitudinal axis where the bearing surface is positionable in the proximal portion of the working chamber and the bearing surface has an effective cross sectional surface area substantially equal to the first cross sectional area. A fixed quantity of a substantially incompressible amplification medium is disposed within and substantially fills the working chamber. An orifice is defined by the housing and is in communication with the working chamber. The orifice defines a second cross sectional area. An actuating rod extends through the orifice. The actuating rod has a first end and an opposite second end and defines a rod axis therebetween. The first end of the rod projects outwardly of the housing. The second end of the rod is disposed within the working chamber in a distal portion of the working chamber which defines a third cross sectional area transverse to the rod axis. The third cross sectional area is greater than second cross sectional area. The second cross sectional area is less than the first cross sectional area whereby the travel distance of the rod is amplified relative to the change in length of the primary driver.

In some embodiments, the incompressible amplification medium is an elastically deformable solid material such as nitrile rubber while in other embodiments, the incompressible amplification medium is a liquid such as hydraulic oil.

The invention comprises, in another form thereof, an actuator that includes a housing defining an interior volume and a primary driver that includes either a piezoelectric element or a magnetorestrictive element. The primary driver has first and second opposing ends and defines a longitudinal length between these first and second ends. The length of the primary driver is controllably variable. A reaction surface is fixed relative to the housing and is bearingly engaged with the first end of the primary driver. A bearing surface is operably coupled to the second end of the primary driver and is longitudinally moveable relative to the housing together with the second end of the primary driver as the length of the primary driver is varied. A closed working chamber is defined within the interior volume and a proximal portion of the working chamber is partially defined by the bearing surface wherein longitudinal movement of the bearing surface varies the volume of the working chamber. The working chamber defines a first cross sectional area oriented transverse to the longitudinal axis where the bearing surface is positionable in the proximal portion of the working chamber and the bearing surface has an effective cross sectional surface area substantially equal to the first cross sectional area. A fixed quantity of a substantially incompressible amplification medium is disposed within and substantially fills the working chamber. An orifice is defined by the housing and is in communication with the working chamber. The orifice defines a second cross sectional area. An actuating rod is at least partially disposed within the orifice. The actuating rod has a first end and an opposite second end and defines a rod axis therebetween with the first end of the rod projecting outwardly of the housing. The second cross sectional area is less than the first cross sectional area whereby the travel distance of the rod is amplified relative to the change in length of the primary driver. The actuator is configured wherein, at approximately 20 degrees Celsius, the working chamber defines a first volume and the amplification medium occupies a second volume, and, at approximately 90 degrees Celsius, the working chamber defines a third volume and the amplification medium occupies a fourth volume. The difference between the first and third volumes is substantially equivalent to the difference between the second and fourth volumes whereby the first end of the actuator rod projects outwardly from the housing by a substantially constant length when the actuator is subjected to thermal changes between approximately 20 and 90 degrees Celsius.

An advantage of the present invention is that it provides a compact actuator design that facilitates its use in applications having limited space.

Another advantage is that in some embodiments, the actuator is configured to compensate for the differential thermal expansion of the actuator components.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
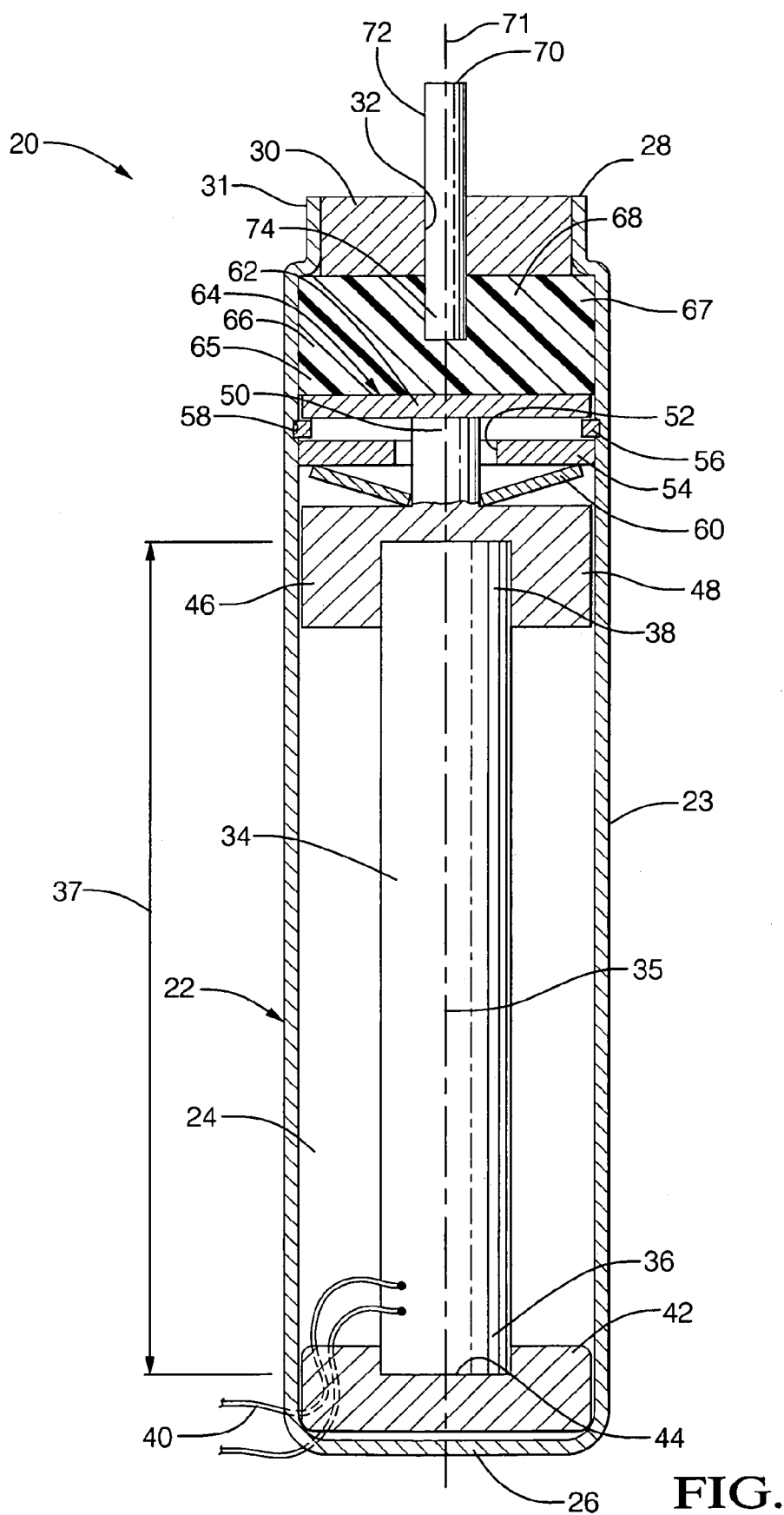
FIG. 1 is a schematic cross sectional view of a first embodiment with the primary driver in a nonextended condition.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

An actuator 20 in accordance with the present invention is schematically illustrated in FIG. 1. Actuator 22 has a housing 22 that defines an interior volume 24 and which includes a generally cylindrical shell 23 having a closed end 26 and open end 28. Housing 22 also includes an end cap 30 having an orifice 32. End cap 30 is mounted in the open end 28 of shell 23 during the assembly of actuator 20 by deforming shell 23 at crimped area 31 which encircles end cap 30 to sealingly engage and secure end cap 30 in the open end 28 of shell 23 after the other components of actuator 20 have been assembled within shell 23.

A primary driver 34 is located in interior volume 24 defined by housing 22. Primary driver 34 is an elongate element having a generally columnar form defining a longitudinal axis 35 and having a first end 36 and an opposite second end 38. In embodiment 20, primary driver 34 is formed of piezoelectric elements. As is well known to those having ordinary skill in the art, piezoelectric elements experience a change in strain when they are subject to an electric potential. This change in strain results in a change in the dimensions, but not volume, of the piezoelectric elements. The strain generated in piezoelectric materials is generally relatively small but the forces generated can be relatively substantial. In embodiment 20 shown in FIG. 1, when an electrical potential is applied to the piezoelectric elements forming primary driver 34, as schematically depicted by wiring 40, the length 37 of primary driver 34 increases. By controlling the voltage applied to primary driver 34, the strain induced in the piezoelectric elements forming primary driver 34, and thus length 37, can also be controlled. As discussed in greater detail below, the controllably variable and relatively small changes in length 37 are amplified to provide actuator 20 with a larger and, thus, more useful actuating mechanical movement.

Base plate 42 is securely fixed in housing 22 at closed end 26. Base plate 42 defines a reaction surface 44. First end 36 of primary driver 34 is seated on reaction surface 44 and provides a bearing surface for primary driver 34. A cap 46 is mounted on the opposite second end 38 of primary driver 34. Cap 46 includes an enlarged diameter portion 48 and a reduced diameter portion 50. The enlarged diameter portion 48 has a recess which receives the second end 38 of the primary driver 34 while the reduced diameter portion 50 extends through central opening 52 in preload plate 54.

Preload plate 54 is prevented from moving longitudinally toward open end 28 of shell 23 by a snap ring 56 which is seated in groove 58 located in the interior surface of housing shell 23. A biasing member 60, is located between preload plate 54 and cap 46 and exerts a longitudinally directed force on primary driver 34 in a direction oriented toward reaction surface 44 via cap 46. In the illustrated embodiment, biasing member 60 is a Belleville washer, however, other suitable devices may also be used with the present invention. The strain differential experienced by a piezoelectric element due to a change in electrical potential is determined in part by the compressive load on the piezoelectric element. Biasing member 60 is sized so that primary driver 34 will remain in a linear reaction range under normal operating conditions.

As the length 37 of primary driver 34 is varied, cap 46 moves longitudinally with second end 38 of primary driver 34. As cap 46 moves, the distal end of reduced diameter portion 50 bears against one surface of piston plate 62. The surface of piston plate 62 opposite reduced diameter portion 50 defines a bearing surface 64.

Figure 2:
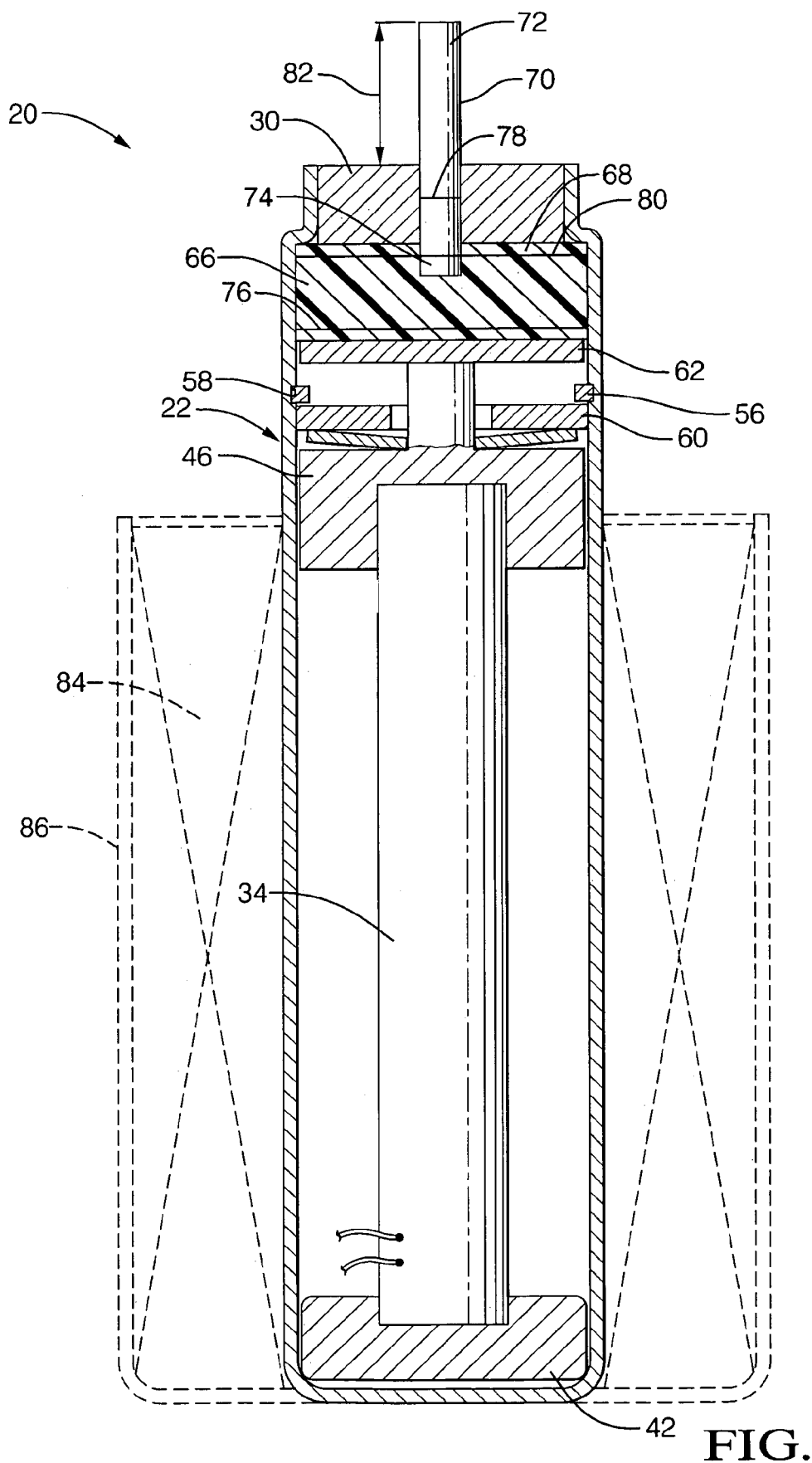
FIG. 2 is a schematic cross sectional view of the first embodiment with the primary driver in an extended condition.

Defined within housing 22 between the bearing surface 64 and end cap 30 is a closed working chamber 66. As bearing surface 64 moves longitudinally, the volume of working chamber 66 is varied. Working chamber 66 is substantially filled with a substantially incompressible amplification medium 68. In the embodiment of FIGS. 1 and 2, incompressible medium 68 is a reaction disk made out of an elastically deformable solid material. The illustrated reaction disk 68 is made out of a nitrile rubber material, however, other solid materials which are sufficiently elastically deformable to substantially conform to the changing shape of working chamber 66 to fill substantially all of working chamber 66 during normal operation of actuator 20 may alternatively be employed.

Working chamber 66 is a closed chamber, in other words the quantity of incompressible medium 68 is fixed and there is no loss or addition of incompressible medium 68 during normal operation of actuator 20. Actuating rod 70 extends through orifice 32 which is in communication with working chamber 66 and projects into working chamber 66.

In the embodiment of FIGS. 1 and 2, rod 70 is generally cylindrical and defines a rod axis 71 extending between a first end 72 and an opposite second end 74. First end 72 projects outwardly of housing 22 while second end 74 is located within distal portion 67 of working chamber 66. As primary driver 34 changes length and bearing surface 64 moves longitudinally within proximal portion 65, the volume of working chamber 66 is altered without a variation in the volume of incompressible medium 68. Thus, the length 82 by which rod 70 projects outwardly from end cap 30 is varied, with rod 70 being projected further outwardly by a decrease in the volume of chamber 66 (lengthening of primary driver 34) and being retracted inwardly by an increase in the volume of chamber 66 (shortening of primary driver 34).

Actuator 20 is configured so that when the length 37 of primary driver 34 is varied, the resulting change in projecting length 82 of rod 70 is amplified. This is best understood with reference to lines 76, 78 and 80 of FIG. 2. Line 76 defines the edge of a cross sectional plane of working chamber 66 oriented transverse to longitudinal axis 35 at the proximal portion of working chamber 66 proximate bearing surface 64. The cross sectional area of working chamber 66 at plane 76 is substantially equivalent to the effective cross sectional surface area of bearing surface 64 (i.e., the area of bearing surface 64 projected on a plane transverse to longitudinal axis 35). Line 78 defines the edge of a cross sectional plane of orifice 32 oriented transverse to rod axis 71. Line 80 defines the edge of a cross sectional plane of working chamber 66 at distal portion 67 where second end 74 of rod 71 is disposed. The cross section of that portion of rod 70 which moves through orifice 32 must, of course, be no greater than the cross sectional area at plane 78. Thus, to compensate for the volume change of working chamber 66 due to a change in the length of primary driver 34, rod 70 must travel a distance sufficient to balance the volume change of working chamber 66. Because of the smaller cross section of rod 70, the travel length of rod 70 is thereby amplified. In the illustrated embodiment 20, rod axis 71 is concentric with longitudinal axis 35 defined by primary driver 34, however, alternative configurations of actuator 20 are also possible.

The extension of second end 74 of rod 70 completely through orifice 32 into the larger distal portion 67 of working chamber 66 (such as at line 80) provides advantages not realizable if second end 74 remained disposed within orifice 32. More specifically, when the second end 74 and that portion of rod 70 proximate second end 74 are generally cylindrical, this allows second end 74 to be inserted through orifice 32 from outside housing 22. Moreover, when such a rod 70 is used in combination with an incompressible medium 68 that takes the form of an elastically deformable solid material, orifice 32 can define an unsealed passageway, as illustrated in FIGS. 1 and 2, and the elastically deformable solid material 68 will still be retained within the working chamber 66 when rod 70 is not present in orifice 32. This allows actuator 20 to be fully assembled except for the insertion of second end 74. Thus, actuating rod 70 could be an integral component of another subassembly with second end 74 projecting therefrom. Second end 74 could then be inserted through orifice 32 when actuator 20 and the other subassembly are engaged together, for example, during the assembly of an automobile.

An alternative embodiment of actuator 20 which utilizes a magnetostrictive element as the primary driver is best understood with reference to FIG. 2. In such an embodiment, primary driver 34 would be formed out of a magnetostrictive material such as Terfenol-D which is commercially available from Etrema Products, Inc. having a place of business at Ames, Iowa. As is well known to those having ordinary skill in the art, magnetostrictive materials undergo a controllably variable strain when subjected to a magnetic field. When a magnetostrictive material is used to form primary driver 34, no wiring 40 is required to communicate an electric potential directly to primary driver 34. Instead, windings 84 and outer casing 86 are mounted on the exterior of shell 23. Shell 23 is made of aluminum to avoid interfering with the magnetic field generated by windings 84 when windings 84 are energized. Biasing member 60 is sized to exert a compressive force on the magnetostrictive material forming primary driver 34 so that the response of the magnetostrictive material to changes in the magnetic field is in a linear range during normal operation of actuator 20.

Many automotive applications for actuators require the actuator to be capable of working in a broad range of thermal conditions. One factor that must be considered when designing an actuator that will be subject to a broad range of thermal conditions, is whether the different coefficients of thermal expansion of the various materials, and corresponding thermal expansions of such materials, forming the actuator will have a negative impact on the performance of the actuator.

Actuator 20 is designed to perform in a thermal range that extends from approximately 20 degrees Celsius to approximately 90 degrees Celsius without having the thermal expansion of the various components forming actuator 20 impair the performance of actuator 20. More specifically, it is calculated that the thermal expansion of an amplification medium 68 formed out of a nitrile rubber disk will experience a thermal expansion, when subjected to an increase of temperature from approximately 20 degrees Celsius to approximately 90 degrees Celsius, that will be substantially offset by an enlargement of the volume of working chamber 66 due to the thermal growth of the parts defining working chamber 66, when subjected to an increase of temperature from approximately 20 degrees Celsius to approximately 90 degrees Celsius. Consequently, when there is no change in the voltage applied to a piezoelectric primary driver 34 (or, in the case of a magnetostrictive primary driver 34, there is no change in the magnetic field), actuating rod 70 will project a distance 82 outwardly from end cap 30 that remains substantially constant when actuator 20 is subjected to an increase of temperature from approximately 20 degrees Celsius to approximately 90 degrees Celsius. In other words, at 20 degrees Celsius, working chamber 66 defines a first volume and amplification medium 68 defines a second volume, and, at 90 degrees Celsius, working chamber 66 defines a third volume and amplification medium 68 defines a fourth volume wherein the difference between the first and third volumes substantially equals the difference between the second and fourth volumes. Although the difference between the thermal growth of the volume of the working chamber 66 and the amplification medium 68 is not the sole factor determining the extent to which distance 82 may be altered due to a change in the temperature of actuator 20, it is a significant factor and maintaining a substantial equality between the change in volume of the working chamber 66 and the change in volume of the amplification medium 68 due to thermal growth will greatly facilitate the performance of actuator 20 under changing thermal conditions.

The most significant dimensions (at both 20 and 90 degrees Celsius), materials and coefficients of thermal expansion of the relevant parts of actuator 20 used in the calculations which were used to conclude that distance 82 would remain substantially constant as actuator 20 was subjected to a change in temperature from 20 to 90 degrees Celsius, are summarized in the following tables:

| PART: Primary Driver 34 | | |
|---|---|---|
| Material: Terfenol-D | | |
| Magnetostrictive Expansion: 1200.0 ppm | | |
| Coefficient of Thermal Expansion: 12.0 ppm/C | | |
| Compressive Strength: 700.0 Mpa | | |
| Dimension | Value at 20 degrees C. | Value at 90 degrees C. |
| Outside Diameter | 6.0 mm | 6.0025 mm |
| Inside Length | 38.2 mm | 38.2264 mm |

| PART: End Cap 30 | | |
|---|---|---|
| Material: SAE 1040 Steel | | |
| Coefficient of Thermal Expansion: 12.0 ppm/C | | |
| Dimension | Value at 20 degrees C. | Value at 90 degrees C. |
| Thickness | 3.00 mm | 3.0025 mm |

PART: Actuating Rod 70
Material: SAE 1040 Steel
Coefficient of Thermal Expansion: 12.0 ppm/C

| Dimension | Value at 20 degrees C. | Value at 90 degrees C. |
|---|---|---|
| Outer Diameter | 1.575 mm | 1.5763 mm |
| Length | 8.0 mm | 8.0067 mm |
| Area | 1.948 mm² | 1.952 mm² |
| Volume | 15.59 mm³ | 15.63 mm³ |
| Volume Increase | | 0.039 mm³ |

PART: Piston Plate 62
Material: SAE 1040 Steel
Coefficient of Thermal Expansion: 12.0 ppm/C

| Dimension | Value at 20 degrees C. | Value at 90 degrees C. |
|---|---|---|
| Thickness | 3.00 mm | 3.0025 mm |
| Piston Plate Diameter | 13.1 mm | 13.4708 mm |
| Volume | 404.3 mm³ | 427.9 mm³ |
| Volume Increase | | 23.573 mm³ |

PART: Cap 46
Material: SAE 1040 Steel
Coefficient of Thermal Expansion: 12.0 ppm/C

| Dimension | Value at 20 degrees C. | Value at 90 degrees C. |
|---|---|---|
| Height (Large Diameter Portion 48) | 3.0 mm | 3.0025 mm |
| Height (Small Diameter Portion 50) | 2.70 mm | 2.7023 mm |

PART: Biasing Member 60 (Belleville Washer)
Material: Spring Steel
Coefficient of Thermal Expansion: 12.0 ppm/C

| Dimension | Value at 20 degrees C. | Value at 90 degrees C. |
|---|---|---|
| Maximum O.D. | 12.5 mm | 12.5105 |
| Minimum I.D. | 6.2 mm | 6.2052 mm |
| Spring Thickness | 0.5 mm | 0.5004 mm |
| Free Height | 0.85 mm | 0.8507 mm |
| Preload Force | 357.0 N | 357.0 N |
| Deflection at Load | 0.15 mm | 0.1501 mm |
| Spring Volume | 46.264 mm³ | 46.381 mm³ |
| Volume Increase: | | 0.117 mm³ |

PART: Amplification Medium 68 (Nitrile Rubber Disk)
Material: Nitrile Rubber
Coefficient of Thermal Expansion: 175.0 ppm/C

| Dimension | Value at 20 degrees C. | Value at 90 degrees C. |
|---|---|---|
| Diameter | 7.5 mm | |
| Height | 2.70 mm | 2.7110 mm |
| Volume of Amplification Medium | 119.28 mm³ | 120.7438 mm³ |
| Volume Increase | | 1.4612 mm³ |

PART: Preload Plate 54
Material: SAE 1040 Steel
Coefficient of Thermal Expansion: 12.0 ppm/C

| Dimension | Value at 20 degrees C. | Value at 90 degrees C. |
|---|---|---|
| Outer Diameter | 7.5 mm | 7.5063 mm |
| Thickness | 2.00 mm | 2.0017 mm |
| Inner Diameter of Opening 52 | 3.0 mm | 3.0025 mm |
| Volume | 74.2 mm³ | 74.4 mm³ |
| Volume Increase | | 0.1872 mm³ |

PART: Baseplate 42
Material: SAE 1040 Steel
Coefficient of Thermal Expansion: 12.0 ppm/C

| Dimension | Value at 20 degrees C. | Value at 90 degrees C. |
|---|---|---|
| Thickness | 3.00 mm | 3.0025 mm |

PART: Housing Shell 23
Material: Aluminum
Coefficient of Thermal Expansion: 23.0 ppm/C

| Dimension | Value at 20 degrees C. | Value at 90 degrees C. |
|---|---|---|
| Inner Diameter | 7.5 mm | 7.5379 mm |
| Wall Thickness | 1.0 mm | 1.0016 mm |
| Shell Area | 44.2 mm² | 44.6 mm² |
| Inside Length of Shell Required by Component Parts | 52.934 mm | 52.986 mm |
| Inside Length of the Shell | 52.934 mm | 53.0189 mm |
| Longitudinal Clearance between Component Parts and Inside Length of Shell | 0.0 mm | 0.0327 mm |
| Volume Inside Shell | 2338.5 mm³ | 2366.1 mm³ |
| Volume Increase | | 28 mm³ |

SUMMARY OF VALUES
Preload Stress: 12.63 MPa
Field: 4042 Amp-turns/in
Full Strain: 1200.00 ppm

| Dimension | Value at 20 degrees C. | Value at 90 degrees C. |
|---|---|---|
| Longitudinal Clearance between Component Parts and Inside Length of Shell | 0.0 mm | 0.0327 mm |
| Volume Change in Working Chamber 66 | 0 mm³ | 1.4612 mm³ |
| Volume Change in Amplification Medium 68 | 0 mm³ | 1.4612 mm³ |
| Rod Travel due to Differential Thermal Expansion of Working Chamber 66 and Amplification Medium 68 | Initial Reference Point | 0.0 mm |
| Hydraulic Multiplication | 22.676 | 22.867 |
| Rod Travel at Rated Field (distance 82) | 1.0393 mm | 1.0490 mm |

Figure 3:
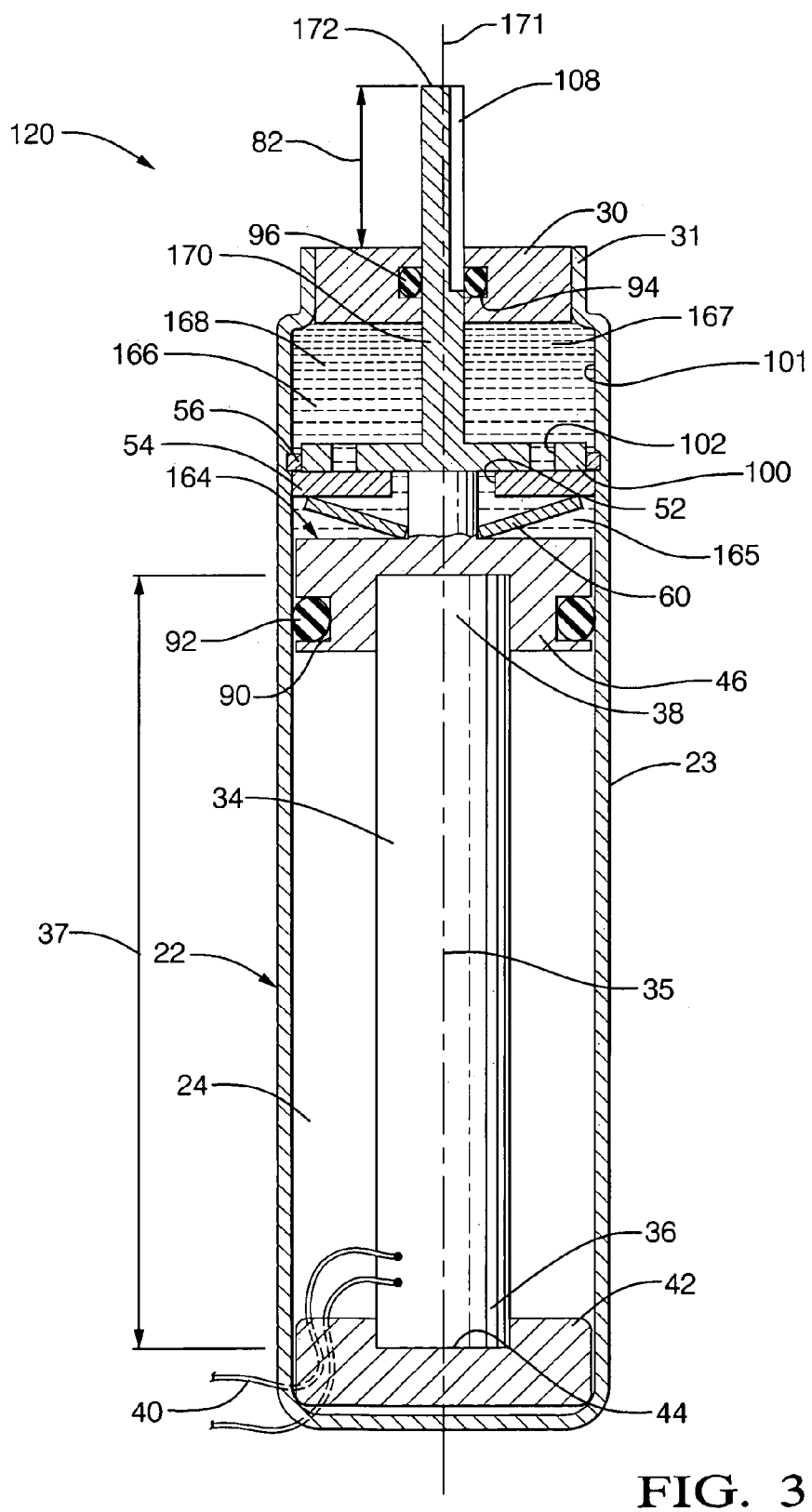
FIG. 3 is a schematic cross sectional view of a second embodiment with the primary driver in a non-extended condition.
Figure 4:
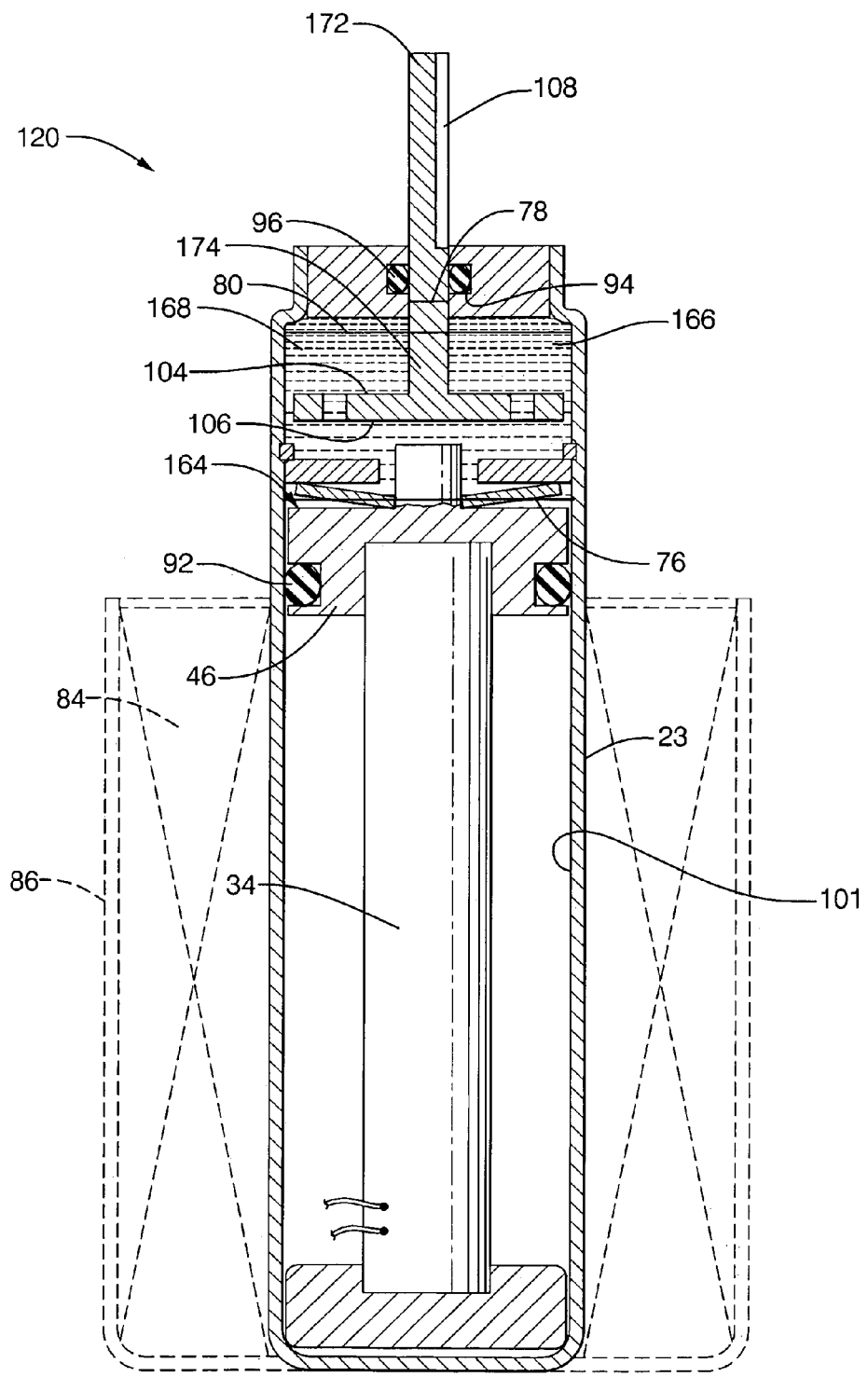
FIG. 4 is a schematic cross sectional view of the second embodiment with the primary driver in an extended condition.

A second embodiment 120 is schematically illustrated in FIGS. 3 and 4. Actuator 120 includes a number of similarities with actuator 20 and similar parts in the two actuators have been given common reference numerals. These commonly numbered parts function in the same manner in actuator 120 as they do in actuator 20 and, to limit redundancy, a complete description of such parts and their functionality is omitted from the discussion of actuator 120.

The primary distinction between actuator 120 and actuator 20 is that actuator 120 utilizes a liquid substantially incompressible amplification medium 168 instead of an elastically deformable solid material. In the illustrated embodiment 120, amplification medium 168 is mineral oil or other suitable hydraulic fluid. Working chamber 166 is sealed to ensure that the oil 168 remains within working chamber 166. At the proximal end of working chamber 166, cap 46 is provided with an external annular groove 90 on its exterior circumference. An O-ring 92 is disposed within groove 90 and provides a seal between cap 46 and the inner surface 101 of shell 23. At the distal end of working chamber 166, orifice 32 is provided with an annular groove 94. O-ring 96 is disposed within groove 94 and sealingly engages actuating rod 170. Oil 168 fills the working chamber 166 which extends between these two O-rings 92, 96 and occupies the volume between cap 30 and bearing surface 164.

Actuating rod 170 defines a rod axis 171 and has a first end 172 extending outwardly from cap 30 and a second end 174 disposed within working chamber 166. Second end 174 has a radially outwardly extending flange 100. Flange 100 extends outwardly to a position proximate inner surface 101 of shell 23 within working chamber 166 and thereby inhibits misalignment of rod 170 during longitudinal movement of rod 170. Flange 100 also includes circumferentially spaced passages 102 to allow oil 168 to pass from distal side 104 of flange 100 to proximal side 106 of flange 100 (and visa versa) as flange 100 moves longitudinally within working chamber 166.

An exterior groove 108 is located on rod 170 proximate first end 172 to facilitate the assembly of actuator 120. Groove 108 is located entirely exterior of O-ring 96 during normal operation of actuator 120. However, during assembly of actuator 120, groove 108 provides communication across O-ring 96 to allow trapped air and excess oil 168 to escape from working chamber 166 as cap 30 is brought into position in the open end of shell 23. After filling chamber 166 with oil 168, rod 170 is positioned with groove 108 providing communication across O-ring 96 and cap 30 is brought into its final position. As second end 174 is inserted into working chamber 166, it displaces excess oil 168 which escapes working chamber 166 via groove 108. Groove 108 is forced outwardly of O-ring 96 where it no longer allows for the escape of oil 168 as cap 30 is brought into its final assembled position and second end 174 engages reduced diameter portion 50 of cap 46. The length of primary driver 34 is kept at its minimum value during assembly. After assembly, working chamber 166 is a closed chamber and the quantity of incompressible medium 168 (e.g., mineral oil or other suitable hydraulic fluid) remains fixed with no addition or loss during normal operation of actuator 120.

A bearing surface 164 is defined on cap 46 and is in contact with the substantially incompressible liquid amplification medium 168. Similar to actuator 20, actuator 120 is configured so that when the length 37 of primary driver 34 is varied, the resulting change in projecting length 82 of rod 170 is amplified. With reference to FIG. 4, line 76 defines the edge of a cross sectional plane of working chamber 166 oriented transverse to longitudinal axis 35 at the proximal portion 165 of working chamber 166 near bearing surface 164. Line 78 defines the edge of a cross sectional plane of orifice 32 oriented transverse to rod axis 171. Line 80 defines the edge of a cross sectional plane of working chamber 166 at a distal portion 167 of working chamber 166 where second end 174 of rod 170 is disposed. In the illustrated embodiment 120, the cross sectional area at planes 76 and 80 within working chamber 166 is approximately the same and both of these areas are larger than the cross sectional area of orifice 32 at plane 78. The cross sectional area of working chamber 166 at plane 76 is substantially equivalent to the effective cross sectional surface area of bearing surface 164 (i.e., the area of bearing surface 164 projected on a plane transverse to longitudinal axis 35). The cross section of that portion of rod 170 which moves through orifice 32 must, of course, be no greater than the cross sectional area at plane 78. Thus, to compensate for the volume change of working chamber 166 due to a change in the length of primary driver 34, rod 170 must travel a distance sufficient to balance the volume change of working chamber 66. Because of the smaller cross section of rod 170, the travel length of rod 170 is thereby amplified. This amplification is evident from a comparison of FIGS. 3 and 4 where elongation of primary driver 34 in FIG. 4 relative to FIG. 3 has moved cap 46 towards end cap 30 while moving rod 170 an even greater distance toward end cap 30 resulting in a separation of second end 174 from reduced diameter portion 50 of cap 46. In the illustrated embodiment 120, rod axis 171 is concentric with longitudinal axis 35 defined by primary driver 34, however, alternative configurations of actuator 120 are also possible.

The primary driver 34 of the illustrated actuator 120 is formed out of one or more piezoelectric elements. However, similar to actuator 20, primary driver 34 may alternatively be a magnetostrictive element. In FIG. 4, an outer casing 86 and windings 84 which would be used with such an alternative magnetostrictive element are shown in dashed outline.

Also similar to actuator 20, actuator 120 is designed to perform in a thermal range that extends from approximately 20 degrees Celsius to approximately 90 degrees Celsius without having the thermal expansion of the various components forming actuator 120 impair the performance of actuator 120. More specifically, it is calculated that the thermal expansion of mineral oil, when used as amplification medium 168, will experience a thermal expansion, when subjected to an increase of temperature from approximately 20 degrees Celsius to approximately 90 degrees Celsius, that will be substantially offset by an enlargement of the volume of working chamber 166 due to the thermal growth of the parts defining working chamber 166, when subjected to an increase of temperature from approximately 20 degrees Celsius to approximately 90 degrees Celsius. Consequently, when there is no change in the voltage applied to a piezoelectric primary driver 34 (or, in the case of a magnetostrictive primary driver 34, there is no change in the magnetic field), actuating rod 170 will project a distance 82 outwardly from end cap 30 that remains substantially constant when actuator 120 is subjected to an increase of temperature from approximately 20 degrees Celsius to approximately 90 degrees Celsius. In other words, at 20 degrees Celsius, working chamber 166 defines a first volume and amplification medium 168 defines a second volume, and, at 90 degrees Celsius, working chamber 166 defines a third volume and amplification medium 168 defines a fourth volume wherein the difference between the first and third volumes substantially equals the difference between the second and fourth volumes. Although the difference between the thermal growth of the volume of the working chamber 166 and the amplification medium 168 is not the sole factor determining the extent to which distance 82 may be altered due to a change in the temperature of actuator 120, it is a significant factor and maintaining a substantial equality between the change in volume of the working chamber 166 and the change in volume of the amplification medium 168 due to thermal growth will greatly facilitate the performance of actuator 120 under changing thermal conditions.

The most significant dimensions (at both 20 and 90 degrees Celsius), materials and coefficients of thermal expansion of the relevant parts of actuator 120 used in the calculations which were used to conclude that distance 82 would remain substantially constant as actuator 120 was subjected to a change in temperature from 20 to 90 degrees Celsius, are summarized in the following tables:

PART: Primary Driver 34
Material: Terfenol-D
Magnetostrictive Expansion: 1200.0 ppm
Coefficient of Thermal Expansion: 12.0 ppm/C
Compressive Strength: 700.0 Mpa

| Dimension | Value at 20 degrees C. | Value at 90 degrees C. |
|---|---|---|
| Outside Diameter | 6.0 mm | 6.0025 mm |
| Inside Length | 24.0 mm | 24.0202 mm |

PART: End Cap 30
Material: SAE 1040 Steel
Coefficient of Thermal Expansion: 12.0 ppm/C

| Dimension | Value at 20 degrees C. | Value at 90 degrees C. |
|---|---|---|
| Thickness | 3.00 mm | 3.0025 mm |

PART: Actuating Rod 170
Material: SAE 1040 Steel
Coefficient of Thermal Expansion: 12.0 ppm/C

| Dimension | Value at 20 degrees C. | Value at 90 degrees C. |
|---|---|---|
| Outer Diameter (rod portion) | 1.575 mm | 1.5763 mm |
| Length (rod portion) | 8.0 mm | 8.0067 mm |
| Flange thickness | 3.0 mm | 3.0025 mm |
| Flange diameter | 11.47 mm | 11.4837 mm |
| Total Volume of Rod 170 | 313.2 mm$^3$ | 314.0 mm$^3$ |
| Volume Increase | | 0.815 mm$^3$ |

PART: Cap 46
Material: SAE 1040 Steel
Coefficient of Thermal Expansion: 12.0 ppm/C

| Dimension | Value at 20 degrees C. | Value at 90 degrees C. |
|---|---|---|
| Outer Diameter (Large Diameter Portion 48) | 11.5 mm | 11.4837 mm |
| Height (Large Diameter Portion 48) | 3.0 mm | 3.0025 mm |
| Area (Large Diameter Portion 48) | 103.401 mm$^2$ | 103.575 mm$^2$ |
| Height (Small Diameter Portion 50) | 2.70 mm | 2.7023 mm |

PART: Biasing Member 60 (Belleville Washer)
Material: Spring Steel
Coefficient of Thermal Expansion: 12.0 ppm/C

| Dimension | Value at 20 degrees C. | Value at 90 degrees C. |
|---|---|---|
| Maximum O.D. | 12.5 mm | 12.5105 |
| Minimum I.D. | 6.2 mm | 6.2052 mm |
| Spring Thickness | 0.5 mm | 0.5004 mm |
| Free Height | 0.85 mm | 0.8507 mm |
| Preload Force | 357.0N | 357.0N |
| Deflection at Load | 0.15 mm | 0.1501 mm |
| Spring Volume | 46.264 mm$^3$ | 46.381 mm$^3$ |
| Volume Increase: | | 0.117 mm$^3$ |

PART: Liquid Amplification Medium 168
Material: Mineral Oil
Coefficient of Thermal Expansion: 600.0 ppm/C

| Dimension | Value at 20 degrees C. | Value at 90 degrees C. |
|---|---|---|
| Total Volume of Oil | 1022.53 mm$^3$ | 1065.48 mm$^3$ |
| Volume Increase | | 42.946 mm$^3$ |

PART: Preload Plate 54
Material: SAE 1040 Steel
Coefficient of Thermal Expansion: 12.0 ppm/C

| Dimension | Value at 20 degrees C. | Value at 90 degrees C. |
|---|---|---|
| Outer Diameter | 11.5 mm | 11.4837 mm |
| Thickness | 2.00 mm | 2.0017 mm |
| Inner Diameter of Opening 52 | 3.0 mm | 3.0025 mm |
| Volume | 192.7 mm$^3$ | 193.2 mm$^3$ |
| Volume Increase | | .4859 mm$^3$ |

PART: Baseplate 42
Material: SAE 1040 Steel
Coefficient of Thermal Expansion: 12.0 ppm/C

| Dimension | Value at 20 degrees C. | Value at 90 degrees C. |
|---|---|---|
| Thickness | 3.00 mm | 3.0025 mm |

| PART: Housing Shell 23 Material: Aluminum Coefficient of Thermal Expansion: 23.0 ppm/C | | |
| --- | --- | --- |
| Dimension | Value at 20 degrees C. | Value at 90 degrees C. |
| Inner Diameter | 11.5 mm | 11.5321 mm |
| Wall Thickness | 1.0 mm | 1.0016 mm |
| Shell Area | 103.4 mm² | 104.4 mm² |
| Inside Length of Shell Required by Component Parts | 39.228 mm | 39.259 mm |
| Inside Length of the Shell | 39.228 mm | 39.2917 |
| Longitudinal Clearance between Component Parts and Inside Length of the Shell | 0.0 mm | 0.0632 mm |
| Volume Inside Shell | 4056.3 mm³ | 4100.6 mm³ |
| Volume Increase | | 44 mm³ |

| SUMMARY OF VALUES Preload Stress: 12.63 MPa Field: 4042 Amp-turns/in Full Strain: 1200.00 ppm | | |
| --- | --- | --- |
| Dimension | Value at 20 degrees C. | Value at 90 degrees C. |
| Volume Change in Working Chamber 66 | Initial Reference Point | 44.3640 mm³ |
| Volume Change in Amplification Medium 68 | Initial Reference Point | 42.9463 mm³ |
| Volume Change Due to Parts Expansion within Working Chamber | Initial Reference Point | 1.4177 mm³ |
| Total Change in Volume of Amplification Medium and Parts within Working Chamber | | 44.3640 mm³ |
| Rod Travel due to Differential Thermal Expansion of Working Chamber and Amplification Medium | Initial Reference Point | 0.0 mm |
| Hydraulic Multiplication | 53.073 | 53.521 |
| Rod Travel at Rated Field (distance 82) | 1.5285 mm | 1.5427 mm |

It is noted that some minor inconsistencies may be present in these proof-of-concept tables for each of the actuators 20, 120 due to rounding variations, simplifying assumptions and other factors. These tables, however, are not presented for purposes of manufacture but to demonstrate the validity of an actuator design in which the thermal expansion changes in the working chamber volume are substantially balanced by thermal expansion changes in the amplification medium volume.

While this invention has been described as having an exemplary design, the present invention may be further modified within the spirit and scope of this disclosure. This application is therefore intended to cover any variations, uses, or adaptations of the invention using its general principles.

What is claimed is:

1. An actuator comprising:
a housing defining an interior volume;
a primary driver comprising one of the group consisting of a piezoelectric element and a magnetostrictive element, said primary driver having first and second opposing ends and defining a longitudinal length between said first and second ends of said primary driver, said length of said primary driver being controllably variable;
a reaction surface fixed relative to said housing, said reaction surface bearingly engaged with said first end of said primary driver;
a bearing surface operably coupled to said second end of said primary driver, said bearing surface being longitudinally moveable relative to said housing together with said second end of said primary driver as said length of said primary driver is varied;
a closed working chamber defined within said interior volume, a proximal portion of said working chamber being partially defined by said bearing surface wherein longitudinal movement of said bearing surface varies the volume of said working chamber, said working chamber defining a first cross sectional area oriented transverse to said longitudinal axis where said bearing surface is positionable in said proximal portion of said working chamber, said bearing surface having an effective cross sectional surface area substantially equal to said first cross sectional area;
a fixed quantity of a substantially incompressible amplification medium, said amplification medium being disposed within said working chamber;
an orifice defined by said housing, said orifice in communication with said working chamber and defining a second cross sectional area; and
an actuating rod having a first end and an opposite second end and defining a rod axis therebetween, said rod extending through said orifice with said first end projecting outwardly of said housing and said second end being disposed within said working chamber in a distal portion of said working chamber, said distal portion of said working chamber defining a third cross sectional area transverse to said rod axis, said third cross sectional area being greater than second cross sectional area; and
wherein said second cross sectional area is less than said first cross sectional area whereby the travel distance of said rod is amplified relative to the change in length of said primary driver; and
wherein said second end of actuating rod disposed within said working chamber is surrounded by said incompressible amplification medium.

2. The actuator of claim 1 wherein said primary driver comprises a piezoelectric element.

3. The actuator of claim 1 wherein said primary driver comprises a magnetostrictive element.

4. The actuator of claim 1 further comprising a biasing member operably coupled with said primary driver and biasing said primary driver toward said reaction surface.

5. The actuator of claim 1 wherein said incompressible medium comprises an elastically deformable solid material which substantially fills said working chamber.

6. The actuator of claim 5 wherein said elastically deformable solid material comprises nitrile rubber.

7. The actuator of claim 5 wherein said second end of said rod and a portion of said rod proximate said second end is a substantially cylindrical whereby said second end of said rod is insertable through said orifice from a position exterior of said housing.

8. The actuator of claim 7 wherein said orifice defines an unsealed passageway and said elastically deformable solid material is retained within said working chamber when said rod is removed from said orifice.

9. The actuator of claim 8 wherein said rod axis is substantially concentric with said longitudinal axis.

10. The actuator of claim 1 wherein said incompressible medium comprises hydraulic oil.

11. The actuator of claim 10 wherein said second end of said rod includes a laterally extending flange, said flange preventing passage of said second end through said orifice.

12. The actuator of claim 11 wherein said flange extends outwardly to a position proximate a surface of said working chamber and thereby inhibits misalignment of said rod during movement of said rod, said flange further defining a passage for said hydraulic oil, said passage allowing said hydraulic oil to flow from one side of said flange to another side of said flange during movement of said rod.

13. The actuator of claim 10 wherein said rod axis is substantially concentric with said longitudinal axis.

14. The actuator of claim 10 further comprising a sealing member disposed within said orifice and sealingly engaged with said housing and said actuating rod, said actuating rod having an exterior groove disposed proximate said first end and disposed entirely exterior of said sealing member during normal operation of said actuator, said exterior groove permitting escape of excess hydraulic oil through said orifice past said seal member during assembly of said actuator.

15. The actuator of claim 1 wherein, at approximately 20 degrees Celsius, said working chamber defines a first volume and said amplification medium occupies a second volume, and, at approximately 90 degrees Celsius, said working chamber defines a third volume and said amplification medium occupies a fourth volume; the difference between said first and third volumes being substantially equivalent to the difference between said second and fourth volumes whereby said first end of said actuator rod projects outwardly from said housing by a substantially constant length when said actuator is subjected to thermal changes between approximately 20 and 90 degrees Celsius.

16. An actuator comprising:
a housing defining an interior volume;
a primary driver comprising one of the group consisting of a piezoelectric element and a magnetorestrictive element, said primary driver having first and second opposing ends and defining a longitudinal length between said first and second ends of said primary driver, said length of said primary driver being controllably variable;
a reaction surface fixed relative to said housing, said reaction surface bearingly engaged with said first end of said primary driver;
a bearing surface operably coupled to said second end of said primary driver, said bearing surface being longitudinally moveable relative to said housing together with said second end of said primary driver as said length of said primary driver is varied;
a closed working chamber defined within said interior volume, a proximal portion of said working chamber being partially defined by said bearing surface wherein longitudinal movement of said bearing surface varies the volume of said working chamber, said working chamber defining a first cross sectional area oriented transverse to said longitudinal axis where said bearing surface is positionable in said proximal portion of said working chamber, said bearing surface having an effective cross sectional surface area substantially equal to said first cross sectional area;
a fixed quantity of a substantially incompressible amplification medium, said amplification medium being disposed within and substantially filling said working chamber;
an orifice defined by said housing, said orifice in communication with said working chamber and defining a second cross sectional area;
an actuating rod having a first end and an opposite second end and defining a rod axis therebetween, said rod extending through said orifice with said first end projecting outwardly of said housing and said second end being disposed within said working chamber in a distal portion of said working chamber, wherein said second end of actuating rod disposed within said working chamber is surrounded by said incompressible amplification medium, and wherein said second cross sectional area is less than said first cross sectional area whereby the travel distance of said rod is amplified relative to the change in length of said primary driver; and
wherein, at approximately 20 degrees Celsius, said working chamber defines a first volume and said amplification medium occupies a second volume, and, at approximately 90 degrees Celsius, said working chamber defines a third volume and said amplification medium occupies a fourth volume; the difference between said first and third volumes being substantially equivalent to the difference between said second and fourth volumes whereby said first end of said actuator rod projects outwardly from said housing by a substantially constant length when said actuator is subjected to thermal changes between approximately 20 and 90 degrees Celsius.

17. The actuator of claim 16 wherein said primary driver comprises a piezoelectric element.

18. The actuator of claim 16 wherein said primary driver comprises a magnetorestrictive element.

19. The actuator of claim 16 wherein said incompressible medium comprises an elastically deformable solid material.

20. The actuator of claim 16 wherein said incompressible medium comprises hydraulic oil.

* * * * *